United States Patent
Li et al.

(10) Patent No.: US 11,645,517 B2
(45) Date of Patent: May 9, 2023

(54) INFORMATION PROCESSING METHOD AND TERMINAL, AND COMPUTER STORAGE MEDIUM

(71) Applicant: Tencent Technology (Shenzhen) Company Limited, Shenzhen (CN)

(72) Inventors: Juncen Li, Shenzhen (CN); Fen Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 775 days.

(21) Appl. No.: 16/660,305

(22) Filed: Oct. 22, 2019

(65) Prior Publication Data

US 2020/0050940 A1 Feb. 13, 2020

Related U.S. Application Data

(63) Continuation of application No. PCT/CN2017/108720, filed on Oct. 31, 2017.

(51) Int. Cl.
  *G06Q 40/00* (2023.01)
  *G06N 3/08* (2023.01)
  (Continued)

(52) U.S. Cl.
  CPC .......... *G06N 3/08* (2013.01); *G06F 16/2465* (2019.01); *G06N 3/044* (2023.01)

(58) Field of Classification Search
  USPC ....... 705/35, 45, 37, 39, 40; 706/26, 25, 45; 704/9; 709/201, 227, 217, 218; 726/9, 6,
  (Continued)

(56) References Cited

U.S. PATENT DOCUMENTS 7,890,526 B1 * 2/2011 Brewer ................. G06F 16/242
  709/201
9,201,859 B2 12/2015 Landry et al.
  (Continued)

FOREIGN PATENT DOCUMENTS

CN  1199148 C  4/2005
CN  104424298 A  3/2015
  (Continued)

OTHER PUBLICATIONS

Processing method of multi-mode input data for intelligent robot and robot operation system; Beijing Guangnian Wuxian Science & Tech COL TD; Kuang Yarning; Dec. 21, 2016.. (Year: 2016).*
  (Continued)

*Primary Examiner* — Tien C Nguyen
(74) *Attorney, Agent, or Firm* — Morgan, Lewis & Bockius LLP

(57) ABSTRACT

The present application discloses an information processing method performed at a computing device. The method includes: collecting first information; executing an intent identification task on the first information to obtain an intent identification processing result; executing a slot identification task on the first information according to the intent identification processing result to obtain a slot identification processing result; and outputting a target result according to the slot identification processing result.

20 Claims, 6 Drawing Sheets

(51) Int. Cl.
*G06F 16/2458* (2019.01)
*G06N 3/044* (2023.01)

(58) Field of Classification Search
USPC ............. 726/2; 235/375, 380; 700/236
See application file for complete search history.

(56) References Cited

U.S. PATENT DOCUMENTS

| | | | |
|---|---|---|---|
| 9,583,104 | B2 | 2/2017 | Landry et al. |
| 11,100,296 | B2* | 8/2021 | Jeon .................. G10L 15/22 |
| 2002/0107829 | A1* | 8/2002 | Sigurjonsson ...... G06F 16/9535 |
| 2006/0190436 | A1* | 8/2006 | Richardson ......... G06F 16/3322 |
| 2011/0125764 | A1* | 5/2011 | Carmel ............... G06F 16/3338 |
| | | | 707/E17.014 |
| 2013/0144605 | A1* | 6/2013 | Brager ................. G06F 16/30 |
| | | | 704/9 |
| 2015/0073798 | A1 | 3/2015 | Karov et al. |
| 2015/0081277 | A1* | 3/2015 | Behi .................... G06F 40/205 |
| | | | 704/9 |
| 2016/0253310 | A1 | 9/2016 | Hazen et al. |
| 2018/0189274 | A1* | 7/2018 | Noh ..................... G06F 40/10 |
| 2018/0233143 | A1* | 8/2018 | Papangelis ........... G10L 15/16 |
| 2018/0329884 | A1* | 11/2018 | Xiong .................. G06N 3/045 |
| 2018/0330718 | A1* | 11/2018 | Hori .................... G06N 3/08 |
| 2018/0349359 | A1* | 12/2018 | McCann .............. G06F 40/30 |
| 2019/0034542 | A1* | 1/2019 | Ming ................... G06F 16/9535 |

FOREIGN PATENT DOCUMENTS

| | | | |
|---|---|---|---|
| CN | 105893345 | A | 8/2016 |
| CN | 106239506 | A | 12/2016 |
| CN | 106383872 | A | 2/2017 |
| CN | 106383875 | A | 2/2017 |
| CN | 106407178 | A | 2/2017 |
| CN | 106557461 | A | 4/2017 |
| CN | 107133345 | A | 9/2017 |
| CN | 107203265 | A | 9/2017 |
| CN | 107220235 | A | 9/2017 |
| CN | 107291828 | A | 10/2017 |
| CN | 107301227 | A | 10/2017 |
| JP | 2015148910 | A | 8/2015 |
| JP | 2015527683 | A | 9/2015 |

OTHER PUBLICATIONS

The Technology Behind Personal Digital Assistants: An overview of the system architecture and key components; IEEE Signal Processing Magazine (vol. 34, Issue: 1, pp. 67-81); Ruhi Sarikaya; Jan. 1, 2017. (Year: 2017).*
Tencent Technology, WO, PCT/CN2017/108720, Aug. 2, 2018, 3 pgs.
Tencent Technology, IPRP, PCT/CN2017/108720, May 5, 2020, 4 pgs.
Tencent Technology, ISR, PCT/CN2017/108720, Aug. 2, 2018, 2 pgs.

* cited by examiner

INFORMATION PROCESSING METHOD AND TERMINAL, AND COMPUTER STORAGE MEDIUM

CROSS-REFERENCE TO RELATED APPLICATION

This application is a continuation application of PCT/CN2017/108720, entitled "INFORMATION PROCESSING METHOD, TERMINAL, COMPUTER STORAGE MEDIUM" filed on Oct. 31, 2017, which is incorporated by reference in its entirety.

FIELD OF THE TECHNOLOGY

The present application relates to a human-computer interaction processing technology, and in particular, to an information processing method, a terminal, and a computer storage medium.

BACKGROUND OF THE DISCLOSURE

In a process in which a user performs human-computer interaction with a terminal, the terminal needs to make accurate feedback on a query asked by the user. For example, when the terminal is a mobile phone, and the user queries in a voice form: "What are the movies on Friday?", the mobile phone can first parse the inputted query in a voice form to obtain query content in a text form, and then searches a local database or a web server for an answer corresponding to the query.

During human-computer interaction, a terminal may be an electronic apparatus such as a smart speaker or a smart TV in addition to a mobile phone. A smart speaker is used as an example. If a user puts forward a query: "I want to listen to a song A of Zhou Jielun (a Chinese pop singer)", particular keywords included in the query are "Zhou Jielun" and "Song A". In this case, how to find an answer to the query? In the related technology, a close answer can be given only after a large amount of information in a local database or a web server is searched. Disadvantages of the related technology are as follows: A search range is large and much time is consumed; and it is possible that a searched answer is not feedback information that meets a user requirement most and that is most likely, and therefore, accuracy is not high, affecting an overall effect of human-computer interaction.

However, there is no effective solution to the above disadvantages in the related art.

SUMMARY

In view of the above, embodiments of the present application provide an information processing method, a terminal, and a computer storage medium, so that at least problems existing in the related technology are resolved.

An embodiment of the present application provides an information processing method performed by a computing device having one or more processors, memory, and one or more computer programs stored in the memory to be executed by the one or more processors, the method comprising:

collecting first information;

executing an intent identification task on the first information to obtain an intent identification processing result;

executing a slot identification task on the first information according to the intent identification processing result, to obtain a slot identification processing result; and outputting a target result according to the slot identification processing result.

An embodiment of the present application provides computing device comprising one or more processors, memory coupled to the one or more processors and a plurality of programs stored in the memory that, when executed by the one or more processors, cause the computing device to perform the aforementioned information processing method.

An embodiment of the present application provides a non-transitory computer readable storage medium storing a plurality of machine readable instructions in connection with a computing device having one or more processors, wherein the plurality of machine readable instructions, when executed by the one or more processors, cause the computing device to perform the aforementioned information processing method.

According to the embodiments of the present application, the first information is collected, and the intent identification task is executed on the first information to obtain the intent identification processing result, and then the slot identification task is executed according to the intent identification processing result to obtain the slot identification processing result. In this serial processing mechanism, association between feature attributes of the two processing results of the intent identification task and the slot identification task can be utilized to output the target result according to the slot identification processing result. Since the serial processing mechanism can achieve an association effect, a search range can be narrowed, and an excessive waste of time is avoided. For a user, processing is transparent, and the user can get a desired answer quickly only after inputting a query. In addition, the answer has high accuracy, and is feedback information that meets a user requirement most and that is most likely, so that an overall effect of human-computer interaction is improved.

DESCRIPTION OF EMBODIMENTS

Implementation of the technical solutions is further described in detail below with reference to the accompanying drawings.

In the following detailed descriptions, numerous specific details are described to provide a thorough understanding of the present application. However, it is apparent to a person of ordinary skill in the art that the present application may be practiced without these specific details.

In addition, although the terms "first", "second", and the like are used multiple times herein to describe various elements (or various thresholds or various applications or various instructions or various operations) and the like, these elements (or thresholds or applications or instructions or operations) should not be limited by these terms. These terms are merely used to distinguish between one element (or threshold or application or instruction or operation) and another element (or threshold or application or instruction or operation).

The steps in the embodiments of the present application are not necessarily processed in the order of the steps described, and the steps may be selectively arranged to be reordered according to requirements, or the steps in the embodiments may be deleted, or the steps in the embodiments may be added. The steps in the embodiments of the present application are merely described in optional combinations of orders, and do not represent all step order combinations of the embodiments of the present application. The order of the steps in the embodiments cannot be considered as a limitation on the present application.

The term "and/or" in the embodiments of the present application refers to any and all possible combinations including one or more of associated listed items. It should be further noted that, when used in the specification, the term "include/comprise" specifies the presence of described features, integers, steps, operations, elements and/or components, but does not exclude the presence or addition of one or more other features, integers, steps, operations, elements and/or components and/or groups thereof.

An intelligent terminal in the embodiments of the present application may be implemented in various forms. For example, a mobile terminal described in the embodiments of the present application may include, for example, a smart speaker, a smart TV, a mobile phone, a smartphone, a notebook computer, a numerical broadcast receiver, a personal digital assistant (PDA), a tablet computer (PAD), a portable multimedia player (PMP), or a navigation device.

Figure 1:
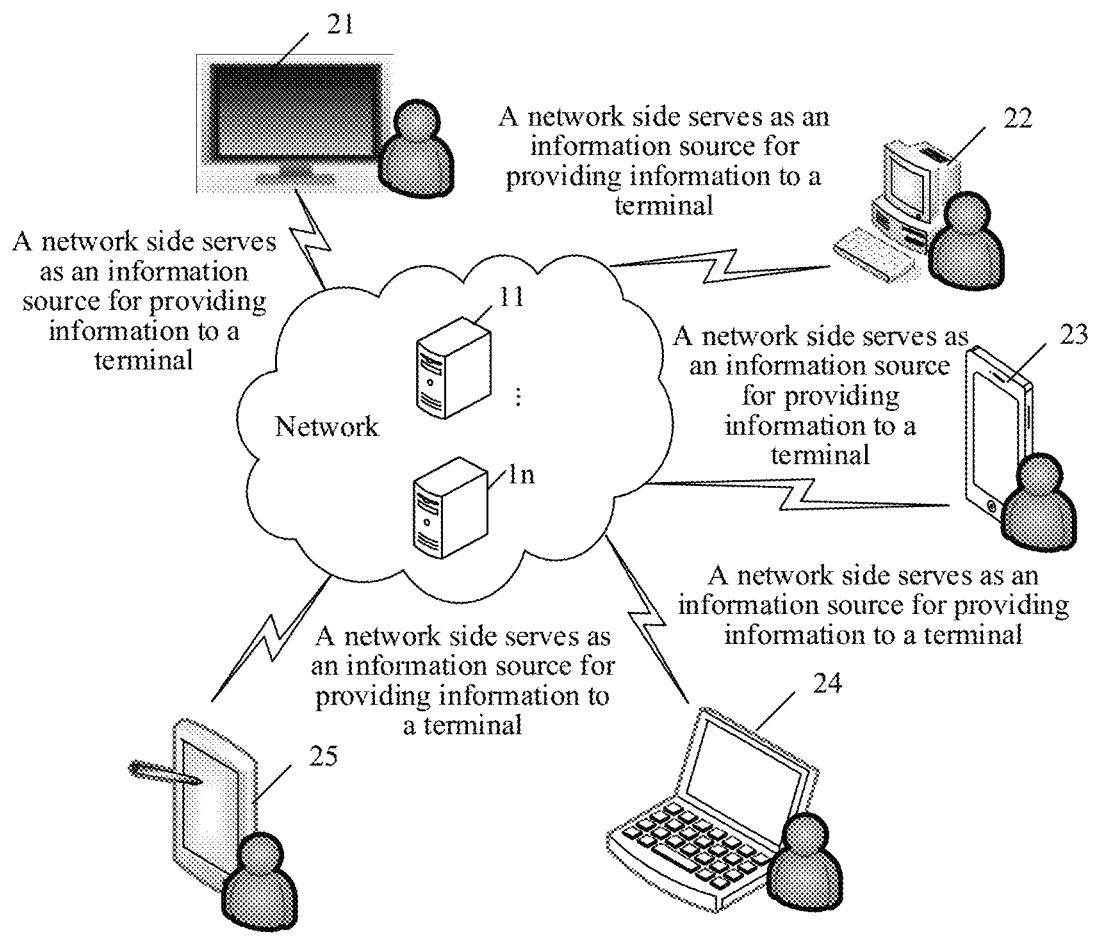
FIG. 1 is a schematic diagram of hardware entities performing data exchange according to an embodiment of the present application.

FIG. 1 is a schematic diagram of hardware entities performing data exchange according to an embodiment of the present application. FIG. 1 includes: servers 11-1n on a network side and terminals 21-25. The terminals 21-25 performs information exchange with the servers 11-1n on the network side in wireless or wired manner. The number of servers and the number of terminals in FIG. 1 are merely illustrative, and do not limit specific numbers of servers and terminals.

Figure 2:
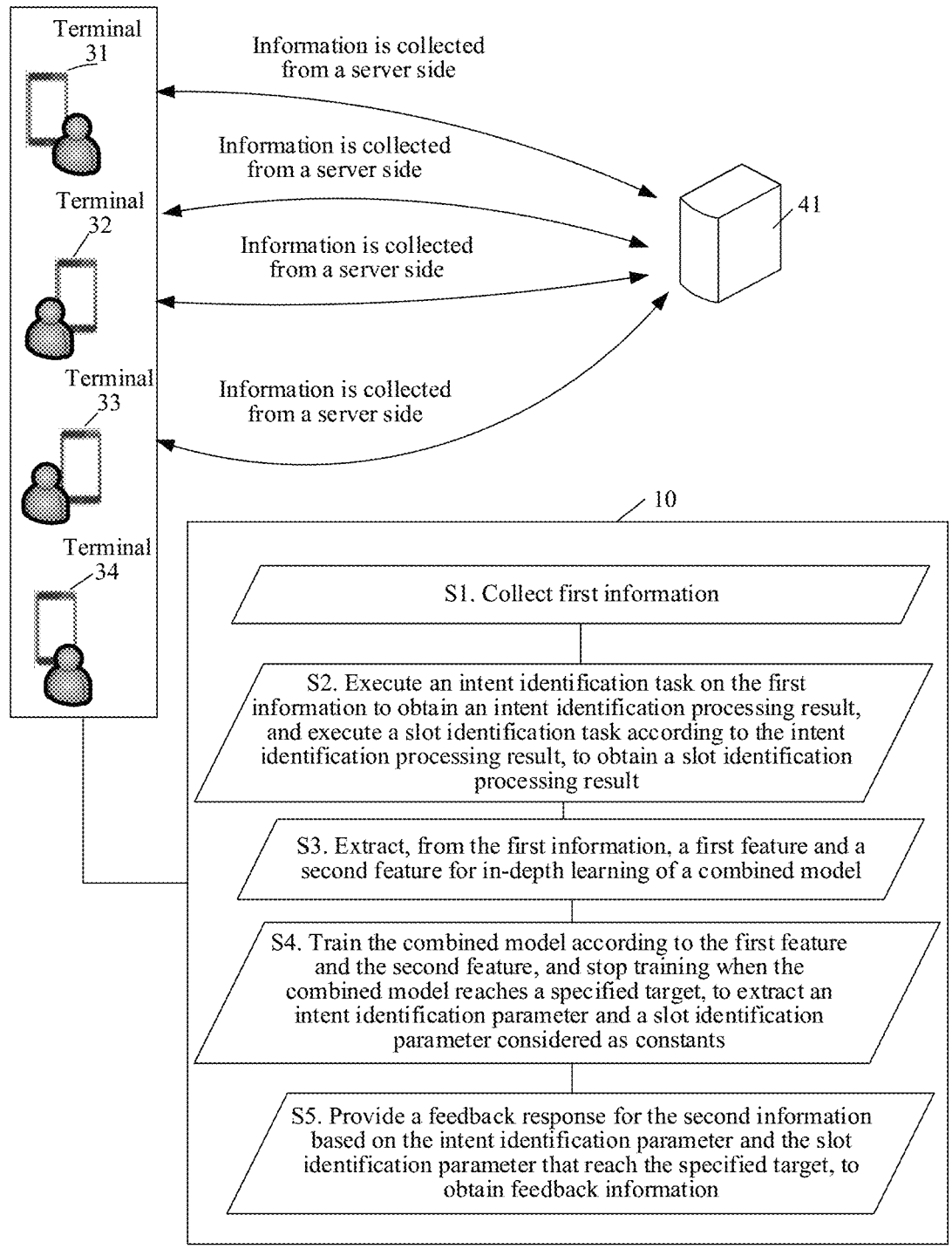
FIG. 2 is a schematic diagram of applying a method according to an embodiment of the present application to an information exchange scenario.

FIG. 2 is a schematic diagram of applying an information processing method according to an embodiment of the present application to an information exchange scenario, including terminals 31-34 and a server 41. In the schematic diagram, specific processing logic may be executed on a terminal side, and a server side serves as an information source. In addition to obtaining information for executing the specific processing logic from a server on a network side, the terminal can further obtain locally the information for executing the specific processing logic. When the intelligent terminal is a smart speaker, processing logic 10 of the terminal includes the following steps. S1. Collect first information (including information collected locally and from the server side, and the information herein is analysis information for establishing a combined model, instead of information that is obtained in real time and that needs feedback, for example, existing information A-C is collected for analysis to establish a combined model, and the combined model is subsequently trained, and then information F obtained in real time is fed back) is collected. S2. Execute an intent identification task on the first information to obtain an intent identification processing result, and execute a slot identification task according to the intent identification processing result to obtain a slot identification processing result. In the serial mechanism (the intent identification task is first executed to obtain the intent identification processing result, and then the slot identification task is executed according to the intent identification processing result to obtain the slot identification processing result), association between feature attributes of the two tasks can be utilized. S3. Extract a first feature (for example, an auxiliary feature that is constructed artificially) and a second feature (for example, an in-depth feature obtained based on a neural network) used for in-depth learning of the combined model from the first information. S4. Train the combined model based on the second feature and using the first feature, stop training when the combined model reaches a specified target, and extract an intent identification parameter considered as a constant and a slot identification parameter considered as a constant. It should be noted that the intent identification parameter and the slot identification parameter are variables constantly changing during training of the combined model, can may be considered as a constant when reaching the specified target. "Constant" herein means that a new combined model composed of an intent identification parameter and a slot identification parameter that reach the specified target can be used to provide a feedback response for the second information. S5. Provide a feedback response for the second information based on the new combined model composed of the intent identification parameter and the slot identification parameter that reach the specified target, to obtain feedback information. Herein, the second information is different from the foregoing first information, and the second information is a query put forward by a user in real time. The first information includes data of numerous queries, and is used for modeling.

The foregoing example of FIG. 2 is merely an example of a system architecture for implementing an embodiment of the present application, and the embodiment of the present application is not limited to the system architecture in FIG. 2. Based on the system architecture in FIG. 2, various embodiments of the present application method are proposed.

Figure 3:
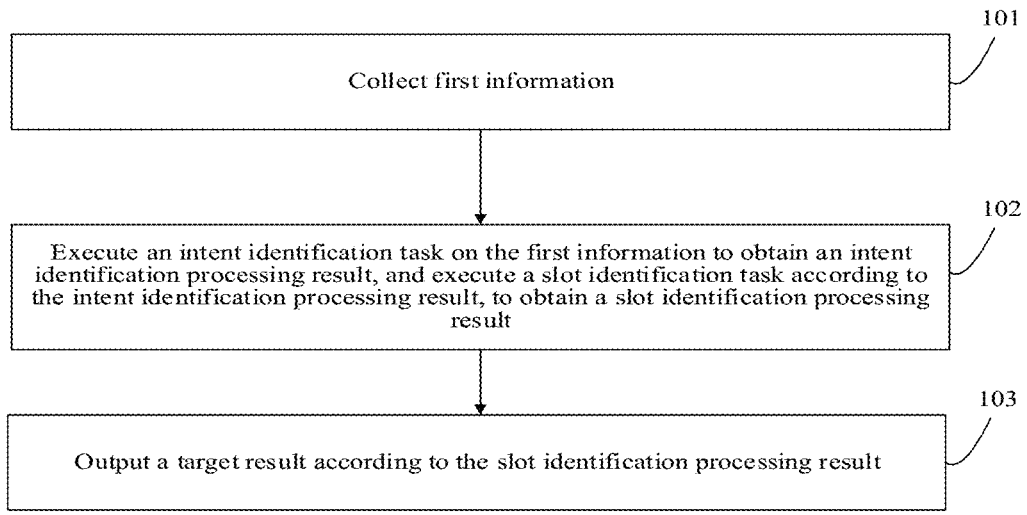
FIG. 3 is a schematic flowchart of implementation of a method according to an embodiment of the present application.

The information processing method in this embodiment of the present application may be performed by a terminal. The terminal includes one or more processors and a memory, and one or more computer programs, the one or more processors being configured to execute the computer program. As shown in FIG. 3, the method includes the following steps: First information is collected (101), for example, collecting numerous queries put forward by a user during human-computer interaction. The query may be obtained from a data source provided by a server. A terminal in human-computer interaction with a user may be a variety of artificial intelligence terminals such as chatting robots used for customer services and consulting, smart speakers, or smart televisions. AI is a branch of computer science. Based on essence of intelligence, a new intelligent machine that responds in a manner similar to human intelligence is produced. AI involves AI robotics, language recognition, image recognition, natural language processing and expert systems, and the like. AI has an increasingly large application field, which is not limited to the intelligent terminal (such as a smart speaker) mentioned in this text. An intent identification task is executed on the first information to obtain an intent identification processing result, and a slot identification task is executed according to the intent identification processing result to obtain a slot identification processing result (102). The intent identification task may be referred to as a classification task, and the slot identification task may be referred to as a sequence labeling task. A specific process of executing the intent identification task and the slot identification task is to process the two tasks in one execution module. The intent identification task is first executed on the first information to obtain the intent identification processing result, and the slot identification task is then executed according to the intent identification processing result, so that association between feature attributes in the processing results of the two tasks can be utilized. Therefore, in this serial mechanism, that is, the intent identification task is first executed on the first information, and after the intent identification processing result is obtained, the slot identification task is then executed according to the intent identification processing result, so that an accurate slot identification processing result can be obtained. Then, an accurate target result can be subsequently obtained according to the slot identification processing result, and the target result is output. A target result is output according to the slot identification processing result (103).

In an embodiment, a combined model may be constructed based on the intent identification parameter and the slot identification parameter. The intent identification parameter and the slot identification parameter are variables constantly changing during training of the combined model. A combined model constructed according to the intent identification parameter and the slot identification parameter in an initial state may be referred to as a first combined model. The combined model is trained until a specified target is reached. In this case, the intent identification parameter and the slot identification parameter may be considered as a constant. Herein, "constant" means that a new combined model may be constructed according to an intent identification parameter and a slot identification parameter that reach the specified target. The new combined model is different from the first combined model and may be referred to as a second combined model.

The two tasks of intent identification and slot identification are combined, and in a process of constructing the combined model according to the intent identification parameter and the slot identification parameter, combined learning of machine learning is performed in a same module, so as to obtain a combined module of association established based on the association effect of intent identification and slot identification obtained using the serial mechanism. An effect of the combined model (accuracy of the model) is much better than that obtained using two separate modules (for example, the intent identification task and the slot identification task are executed in different modules).

The information processing method in this embodiment of the present application further includes the following steps: A first feature (104) used for in-depth learning of the combined model is extracted from the first information. The first feature refers to an auxiliary feature, and the auxiliary feature refers to some artificially constructed features. A second feature used for in-depth learning of the combined model is extracted from the first information (105). The second feature refers to an in-depth feature, and the in-depth feature is a feature obtained based on a sequence labeling model. A smart speaker that searches for a keyword of a music type is used as an example, and the sequence labeling model may be a cyclic neural network (RNN). In other technical fields, in case of a non-music type search, the sequence labeling model may be other non-RNN models, as long as best keyword matching in the technical field can be achieved. In other words, this embodiment is not limited to the RNN, and the neural network model for machine learning and the model for sequence labeling are both applicable to this embodiment of the present application.

The information processing method in this embodiment of the present application further includes the following steps: The combined model is trained according to the second feature and the first feature (106). For example, the combined model is trained using the RNN model and the auxiliary feature. When the combined model reaches the specified target (a target function of the specified target is one that meets a user requirement most and that has is most likely), training is stopped, and a first target parameter and a second target parameter are extracted (107). For example, the first target parameter is a target parameter corresponding to a first parameter and the second target parameter is a target parameter corresponding to a second parameter, which are obtained through combined learning. In actual application, the first parameter (such as an intent identification parameter) and the second parameter (such as a slot identification parameter) in the combined model are initially variables. When a value of the target function corresponding to the combined model reaches a largest likelihood through machine learning training on the combined model, training is stopped, and current first parameter (such as an intent identification parameter) and second parameter (such as a slot identification parameter) are considered as a constant. Based on the constant, desired feedback information (an answer to a query) for a query put forward by a user can be obtained, the feedback information meeting a user requirement most and being most likely. When the target function of the first parameter (such as the intent identification parameter) and the second parameter (such as the slot identification parameter) meet a user equipment most and is most likely, training is stopped, and the first target parameter (the target parameter corresponding to the first parameter obtained through combined learning) and the second target parameter (the target parameter corresponding to the second parameter obtained through combined learning) are extracted. Second information is obtained (108). In an example, all processing before the second information is obtained is based on the first information, that is, data including numerous queries, for example, a target parameter obtained by training the combined model using the RNN model and the auxiliary feature. The target parameter includes a target parameter for intent identification and a target parameter for slot identification. Herein, the second information is different from the foregoing first information, and is a query put forward by a user in real time. Accurate feedback information can be found for the second information using the obtained target parameter. A feedback response is provided for the second information according to the first target parameter and the second target parameter, to obtain feedback information (109).

In an embodiment, the first information and the second information may be a query: a user's input. However, the second information is input in real time. A slot means some physical words with particular attributes in the query. For example, a query is "I want to listen to Zhou Jielun's song". A slot is "Singer=Zhou Jielun". The combined model means to perform combined learning of intent identification and slot identification. When a user inputs a query, intent information and slot information desired in the query are obtained using operation logic executed by a terminal. The operation logic is similar to a black box, and the user only needs to input the query. An understandable example is: because intent of the query is definitely intent with a slot, for example, the query is: I want to listen to Zhou Jielun's song, the two tasks of intent identification and slot identification are implemented in a same module, and machine training is performed using strong association between the two tasks. 1). After slot identification is performed on the query "I want to listen to Zhou Jielun's song", a slot "singer=Zhou Jielun" can be obtained through parsing, and in this case, the intent of this query is probably music. 2). After intent identification is performed on the query "I want to listen to Zhou Jielun's song", it can be determined that intent of the query is music, and in this case, parsing needs to be performed only in a slot specific to the music during slot identification. Advantages are as follows: a candidate range for a slot can be effectively reduced, thereby improving accuracy and efficiency.

In terms of intent and a slot, natural language understanding in AI includes identifying a speaker's intent and extracting semantic construction from a natural language query. The two tasks are generally referred to as intent identification and slot filling. Intent identification (or intent speculation) may be understood as an issue of classification of a semantic expression. A classification method includes, for example, a support vector machine (SVM) and an in-depth neural network. Slot filling may be understood as a sequence labeling task. A method for sequence labeling includes a maximum entropy Markov model (MEMM), a conditional random field (CRF), a recurrent neural network (RNN), and the like.

In an example, the operation logic of the terminal generally includes: collecting information; labeling (including intent labeling and slot labeling); extracting an auxiliary feature (a dictionary is constructed artificially); extracting a feature automatically (preferably, an RNN model algorithm); training a combined model using the RNN model and the auxiliary feature, to obtain a target function of the combined model. The target function is used to compute a likelihood, and the target function includes non-directional parameters (a parameter representing intent identification and a parameter representing slot identification). The parameters are trained and tested, and when a largest likelihood is reached, it can be considered that current parameters are constants (which are referred to as constants). Then, the inputted query (for example, denoted as X) is used as a variable in the operation logic, and intent information and slot information expired in the query can be obtained using a constant 1 (a parameter representing intent identification, for example, denoted as a parameter A) and/or a constant 2 (a parameter representing slot identification, for example, denoted as a parameter B). Therefore, according to the query input by the user, based on the foregoing processing logic, the user does not need to be involved in intermediate processing, and a final outputted result "the intent information and the slot information expired in the query" are obtained according to a constructed combined model and a training result thereof. An information model is constructed, so that a search range can be narrowed, and an excessive waste of time is avoided. For a user, the constructed information model is transparent, and the user can get a desired answer quickly only after inputting the query. In addition, the answer has high accuracy, and is feedback information that meets a user requirement most and that is most likely, so that an overall effect of human-computer interaction is improved.

In an embodiment, collecting the first information includes: 1) collecting the first information locally, the first information being from conversation content obtained from a real human-computer interaction environment; and 2) collecting the first information from a network side, and screening the first information to obtain target information, the target information being used to represent conversation content obtained from an almost real human-computer interaction environment. Either one or both of the two methods can be used. After the first information is collected, a first information source composed of the first information and/or the target information is created. Creating a combined model and training the combined model both requires much information in the first source herein.

Why to create a combined model? For this, a smart speaker system is used as an example for the following description.

That a smart speaker system can accurately identify intent and a slot in a query is a key to query analysis, and the smart speaker system is also a key module in an entire system. If intent identification and slot identification are processed in separate modules, that is, an intent identification task and a slot identification task are separately processed in two different modules, possible association of intent identification and slot identification is ignored. However, in actual application, there is strong association between intent identification and slot identification. The two tasks of intent identification and slot identification share many features, and a result of one task is also a strong auxiliary feature for another task. If it is determined through slot identification that the query has a slot, the intent of the query is definitely intent with a slot. For example, a query is "I want to listen to a song A of Faye Wong". After slot identification, slots "singer=Faye Wong" and "song=A" can be obtained through parsing. In this case, intent of the query is probably music. In addition, after intent identification is performed on "I want to listen to a song A of Faye Wong", it can be determined that the intent of the query is music, and in this case, parsing needs to be performed only in a slot specific to the music during slot identification, so that a candidate range for the slot can be effectively reduced. Therefore, due to the strong association between intent identification and slot identification, in this embodiment, the two tasks may be executed in a same module instead of being separately executed in two different modules. Combined learning of intent identification and slot identification is achieved using the constructed combined model. Because the strong association between intent identification and slot identification is fully utilized, the accuracy of intent identification and slot identification by the smart speaker system intent is improved, thereby improving the overall effect of human-computer interaction.

In an example of information collecting, that the terminal is a smart speaker is used as an example, and the collected first information is specifically a query. The query should be as consistent as possible with a query that may appear in the smart speaker product. The query mainly has two sources: 1) First type of data is a query in a speaker log. This query part is one of a conversation between a user and the speaker in a real scenario. Therefore, this query part is one that best reflects a real scenario of the speaker. This query part meets a user requirement most. However, when there are relatively few users, the users obtain relatively little conversation content in a real human-computer interaction environment. In this case, this query part cannot meet training requirements of intent identification and slot identification models. 2) Different from a query in a local speaker log, second type of data is collected from the network side, and a network server serves as a data provider of the second type of data. For example, queries in logs in some official accounts are used. There are a lot of official accounts, and most of the official accounts have a long operation time. Therefore, a data amount is quite large, so that the training requirements of intent identification and slot identification model can be met in a data amount. Therefore, many queries can be extracted from the official accounts as a supplement to the first data. Because the queries in the official accounts cover a relatively wide range, in the technical field of smart speakers, not all queries in official accounts are suitable to be used as a query of the speaker. In other words, although a data amount is ensured, accuracy (whether a user requirement is met) cannot be ensured, and the queries of the official accounts need to be further screened.

In an example of screening the queries of the official accounts, first, the query is pre-filtered according to information such as a length of the sentence (a number of characters included in the sentence) and whether the sentence includes Chinese characters, and the like, and queries whose sentence length is less than 3 or queries whose sentence length is greater than 30 are removed, and sentences without Chinese characters are removed. Then intent classification is performed on these queries using an existing classifier. Finally, queries that match a category of functions of the speaker are screened out, such as music, weather, and reminders.

In an embodiment, after the first data and data that is obtained by screening the second data are obtained, queries in the two data parts are mixed to form a query data set used in a subsequent embodiment for training the combined model, that is, the "first information source" mentioned in the foregoing embodiment.

The intent identification task and the slot identification task are executed on the first information according to the task execution policy of the serial processing mechanism, that is, according to the serial processing policy for the task, the intent identification task is first executed on the first information, and then the slot identification task is executed. In addition, the tasks may be further executed according to a parallel processing policy for the task, that is, the slot identification task is executed on the first information in a parallel manner while intent identification is performed on the first information.

An embodiment of the present application provides an information processing method. In an application scenario of performing processing using a parallel processing mechanism, the information processing method is performed by a terminal, the terminal including one or more processors and a memory, and one or more computer programs, the one or more processors being configured to execute the computer program; and the method including: collecting first information; executing an intent identification task on the first information to obtain an intent identification processing result; executing an intent identification task on the first information to obtain a slot identification processing result; parsing out an intent identification parameter from the intent identification processing result; parsing out a slot identification parameter from the slot identification processing result; creating, according to the intent identification parameter and the slot identification parameter, a first combined model representing feature association between intent identification and slot identification; extracting a first feature from the first information; extracting a second feature from the first information; training the first combined model according to the first feature and the second feature, and stopping training when the first combined model reaches a specified target, to obtain a first target parameter representing intent identification and a second target parameter representing slot identification; and constructing a second combined model according to the first target parameter and the second target parameter.

In an embodiment, when an intent identification task is being executed, a to-be-processed object (for example, a query) may be extracted from the first information source, and first data labeling is performed on the to-be-processed object for intent identification. Sampling detection is performed on a result of the first data labeling, and it is determined that the first labeling result meets a target requirement when accuracy of a detection result is greater than a first threshold. In particular, the two query parts may be mixed to form a query data set. After the query data set is extracted, a data labeling job begins. The data labeling job is performed in two steps. First, an outsourcing person is asked to labeling intent of the query, or the terminal performs labeling locally. Labeled data is distributed in batches. After each batch of data is returned, sampling inspection is performed. 200 of them are randomly selected to test labeling results. If labeling accuracy of the 200 pieces of labeled data is greater than 95%, it is determined that the data is qualified, and a next batch of data is given. Otherwise, if the data is unqualified, the outsourcing person is asked to relabel the data until the accuracy of the data exceeds 95%.

In an embodiment, when a slot identification task is being executed, a to-be-processed object (for example, a query) may be extracted from the first information source, and first data labeling is performed on the to-be-processed object for intent identification. The labeling result includes: a labeling result without a sampling test and/or a labeling result that is obtained after a labeling result and that meets a target requirement. After the to-be-processed object is classified according to the first labeling, at least one classification result that represents different intent. Second data labeling is performed according to the at least one classification result for corresponding slot identification. For example, according to a result of query intent classification, queries of different intent are marked according to different slot standards. Sampling detection is performed on a result of the second data labeling, and it is determined that the second labeling result meets a target requirement when accuracy of a detection result is greater than a second threshold.

In an example of slot labeling, slot labeling is performed on the query after intent labeling of the query is completed. Slots of queries with different intent are also different. For example, a query with music intent has slots such as "singer name" and "song name", but has no slots such as "time" or "place". A query with reminding intent has slots such as "time" and "location", but has no slots such as "singer name" and "song name". Therefore, for slot labeling, labeling is performed on queries with different intent according to a result of query classification based on different slot standards. Slot labeling is still performed in batches. An outsourcing person is asked to mark slots of a query, or a terminal performs labeling locally. For each batch of queries, labeling quality is also detected through the sampling detection. A qualification rate may be 90%, and unqualified label data needs to be relabeled.

Figure 4:
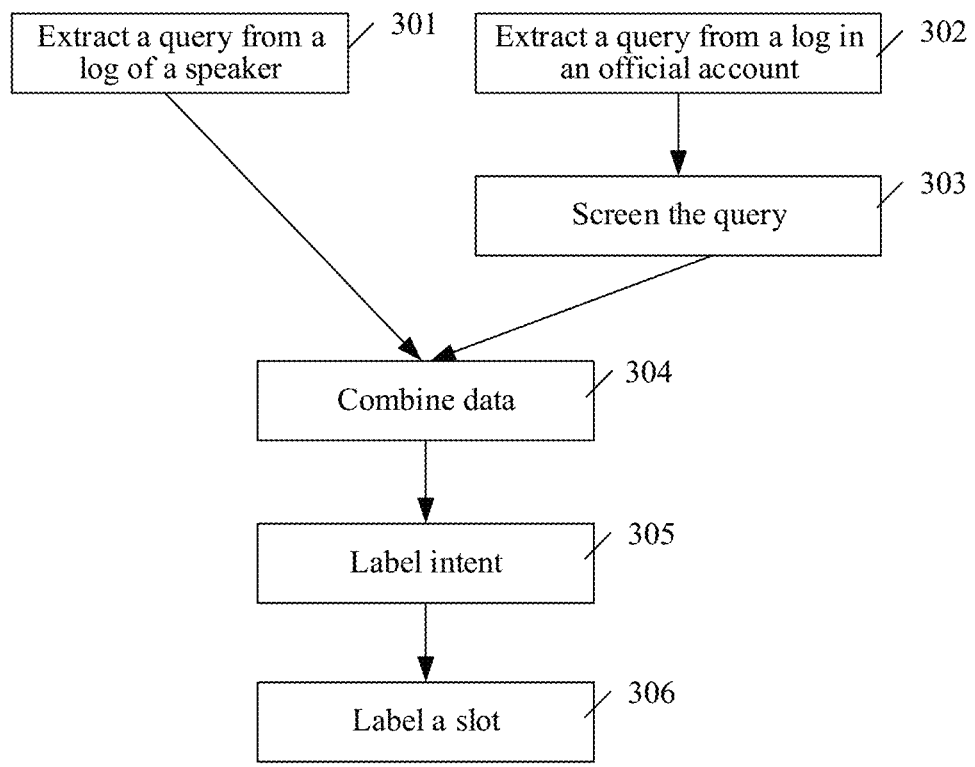
FIG. 4 is a flowchart of data collection and labeling for a query according to an embodiment of the present application.

In an embodiment, a flowchart of data collecting and labeling of a query is shown in FIG. 4, including the following steps:

Step 301. Extract a query from an audio log.
Step 302. Extract a query from a log in an official account.
Step 303. Screen the query.
Step 302 and step 303 and step 301 are in no particular order.
Step 304. Combine data.
Step 305. Label intent.
Step 306. Label a slot.

In this embodiment, intent identification and slot identification are processed in a same module, and combined learning and training are performed on the two tasks, to obtain a combined model obtained based on association between feature attributes of the two tasks. In a process of combined learning and training, this solution can significantly facilitate query analysis, especially intent identification and slot identification of the query, thereby improving accuracy of intent identification and slot identification. Operation of this solution is very simple. The solution may be considered as a black box. As long as a query is input, the method is capable of providing intent information and slot information of the query.

Figure 5:
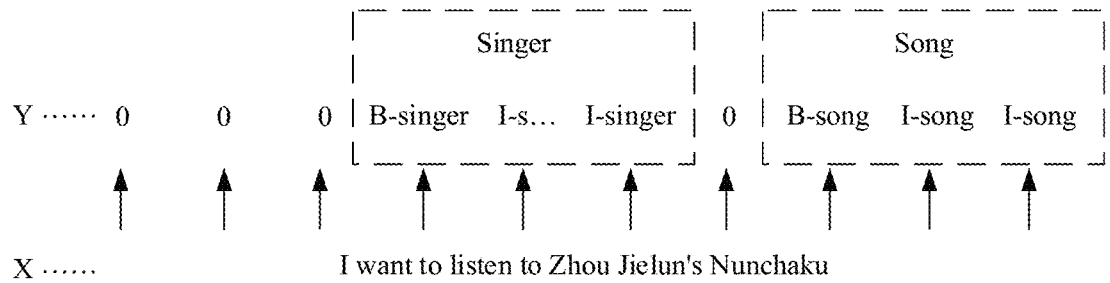
FIG. 5 is a schematic diagram of tag labeling according to an embodiment of the present application.

In an embodiment, an intent identification process may be considered as a classification task, and the slot identification task may be considered as a sequence labeling task. The two tasks are combined using an in-depth learning technology for combined learning. Because tasks of an intent module and a slot module are different, target functions are also different. Therefore, the two modules cannot be combined directly. In this embodiment, the two modules can be effectively combined, and an effect of a combined model (accuracy of the model) is much better than that of two separate modules if intent identification and slot identification are processed in separate modules. Intent identification may be considered as query classification. Currently, most slot analyzing technologies are to use serialized labeling. In this manner, each word in a sentence is labeled, and the label indicates whether the word is in a slot, and then a slot in a query can be found using the label of the word. A schematic diagram of a labeling manner is shown in FIG. 5. It can be seen that compared to processing intent identification and the slot identification in separate modules, in this embodiment, association between intent identification and slot identification is fully utilized, so that finally the accuracy of intent identification and slot identification are significantly improved.

In an embodiment, extracting, from the first information, the first feature for in-depth learning of the combined model includes: extracting a to-be-processed object (for example, a query) from the first information source, and constructing a slot feature word database (for example, a slot feature word table) for the to-be-processed object; and comparing a specified object (for example, a particular query, such as a singer name or a song name) in the to-be-processed object to the slot feature word database in a lexicon matching manner, and searching for all possible slot information included in the specified object. The slot information is used to represent the first feature. Further, extracting, from the first information, a second feature for in-depth learning of the combined model includes: expressing the found slot information as a slot vector; and mapping the slot vector to a varietal RNN (LSTM), and extracting an in-depth feature of the to-be-processed object after fusion with the LSTM, to obtain the second feature.

In an example of feature extraction, an auxiliary feature of a query is extracted. The auxiliary feature refers to some artificially constructed features. Methods for identifying intent and a slot of a query may be to automatically extracting an in-depth feature of the query using an in-depth learning technology, and then performing intent identification and slot identification. However, some artificially extracted auxiliary features can play an important role in intent identification and slot identification of a query. Extraction of an auxiliary feature includes three steps. First, a slot feature word table is constructed. The slot feature word table herein refers to a set of words corresponding to a slot. For example, a feature word table of a slot "song name" is a list of all song names. There are two manners of constructing the word table. In a first manner, the word table is constructed using a local internal resource. For example, a word table for slots such as a song name, a singer name, and a song type is obtained from an internal music application database. In a second manner, the word table is constructed using network data. For example, a place name, an institution name, and the like are crawled from the Internet to construct a corresponding word table for the slots. Secondly, for a particular query, all possible slot information included in the query is found through dictionary matching. Finally, the slot information is expressed. For representation of the slot information, the slot information may be represented using a vector. In particular, the slot information is expressed as a slot vector. Each character has its own slot vector. A length of a vector is a sum of a number of slots. If a character in the query is a character of a word in the slot feature table, a value of the slot in the slot vector of the character is 1, otherwise is 0. For example, it is assumed that there are two slots "singer name" and "song name". A feature word table of the singer name and the song name is shown in Table 1.

TABLE 1

| Singer Name | Song Name |
|---|---|
| Zhou Jielun | Dao Xiang (Dao Xiang) |
| J J Lin | Jiang Nan (Jiang Nan) |
| Andy Lau | Forgiven Love |

For a query "I want to listen to Zhou Jielun's Dao Xiang", a slot vector for each character is shown in Table 2.

TABLE 2

| I | want to | listen to | Zhou | Jie | lun | 's | Dao | Xiang |
|---|---|---|---|---|---|---|---|---|
| 00 | 00 | 00 | 10 | 10 | 10 | 00 | 01 | 01 |

Figure 6:
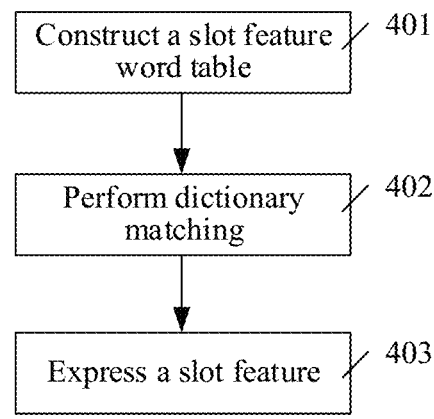
FIG. 6 is a flowchart of auxiliary feature extraction on a query according to an embodiment of the present application.

A flowchart of auxiliary feature extraction on a query is shown in FIG. 6, including the following steps:

Step 401. Construct a slot feature word table.
Step 402. Perform dictionary matching.
Step 403. Express a slot feature.

A combined model is trained using an RNN model and an auxiliary feature. A target function of the combined model is shown in a formula (1).

$$L = a \log p(y|x) + (1-a) \log p(l|x) \qquad (1)$$

Figure 7:
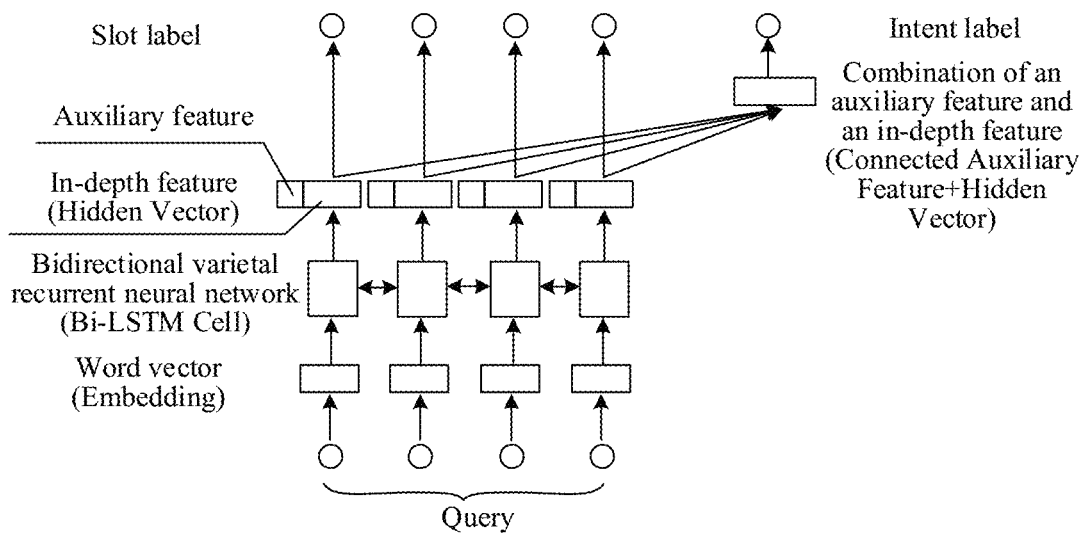
FIG. 7 is a schematic diagram of a model framework in which an auxiliary feature is mapped into a vector and incorporated into a model while an in-depth feature is extracted according to an embodiment of the present application.

L represents a target function used for describing an operation with a largest likelihood, x represents a query that is input, y represents intent of the query, l represents a slot sequence of the query, and α represents an importance coefficient of intent identification. A larger α represents higher importance of intent identification in a system. On the contrary, a smaller one represents a higher importance of slot identification. In an in-depth feature extraction part of the query, LSTM can be applied. An auxiliary feature is mapped into a vector and incorporated into a model while the in-depth feature is extracted. A specific model frame is shown in FIG. 7. As shown in FIG. 7, each word in the query is first mapped into a word vector (Embedding). Then an in-depth feature (Hidden Vector) of a sentence is extracted using a bidirectional varietal RNN (Bi-LSTM). Then the auxiliary feature and the in-depth features are combined. Next classification can be performed using a combined feature. First, for slot identification, a serialized labeling manner may be used, that is, each category is marked with a category label. Secondly, for intent identification, a classification manner may be used, that is, an entire sentence is marked with a category label. Herein, when the entire sentence is labeled, combined feature vectors of words are combined into a combined feature vector of a sentence through averaging of a sum, and then classification is performed using the combined feature vector. Subsequently, the model can be trained using the labeled data. In a training process, model parameters are mainly updated in a gradient descent manner, so that the foregoing target function is maximized, accuracy of the intent identification and slot identification is higher, and processing efficiency is faster.

Feature extraction is performed, and after the combined model is trained according to the feature extraction, a trained model parameter is obtained. After the model parameters are trained, the model can be used for performing intent identification and slot identification on the query. First, auxiliary feature extraction needs to be performed on the query using a constructed slot feature word table, and then an auxiliary feature and the query are input into a pre-trained model together, so that probability distribution of intent of a sentence and probability distribution of a slot label of each word can be obtained. A largest probability is selected to obtain intent information and slot information of the sentence.

In this embodiment, through combined learning of intent and a slot, high accuracy in determining existence of intent and a slot can be achieved. In actual application, the accuracy of intent and a slot can reach more than 85%. This embodiment can be well incorporated into a system of a smart speaker system, effectively improving an overall effect of a reply of the smart speaker. In this embodiment, a running time of the system can also be effectively reduced, so that the smart speaker can respond within a shorter time, thereby improving overall processing efficiency of human-computer interaction.

In addition to being applied to a scenario in which the smart terminal is a smart speaker, this embodiment can be further applied to other AI fields for human-computer interaction. For smart speakers, in-depth features of sentences and words are extracted only using an RNN. In other AI fields, other manners may be used. For example, in-depth features of sentences and words may be extracted using other in-depth neural networks such as a convolutional neural network (CNN).

In the implementation of the present application, in other AI fields, another target function may also be used, such as a formula (2) used for model training. This manner may be considered as predicting intent first, and then predicting a slot, but a prediction structure of the intent is used for prediction of the slot. In this way, association between the intent and the slot can also be used. A specific target function is as follows:

$$L=\log p(y|x)+\log p(l|x,y) \qquad (2)$$

L represents a target function used for describing an operation with a largest likelihood, x represents a query that is input, y represents intent of the query, l represents a slot sequence of the query.

Figure 8:
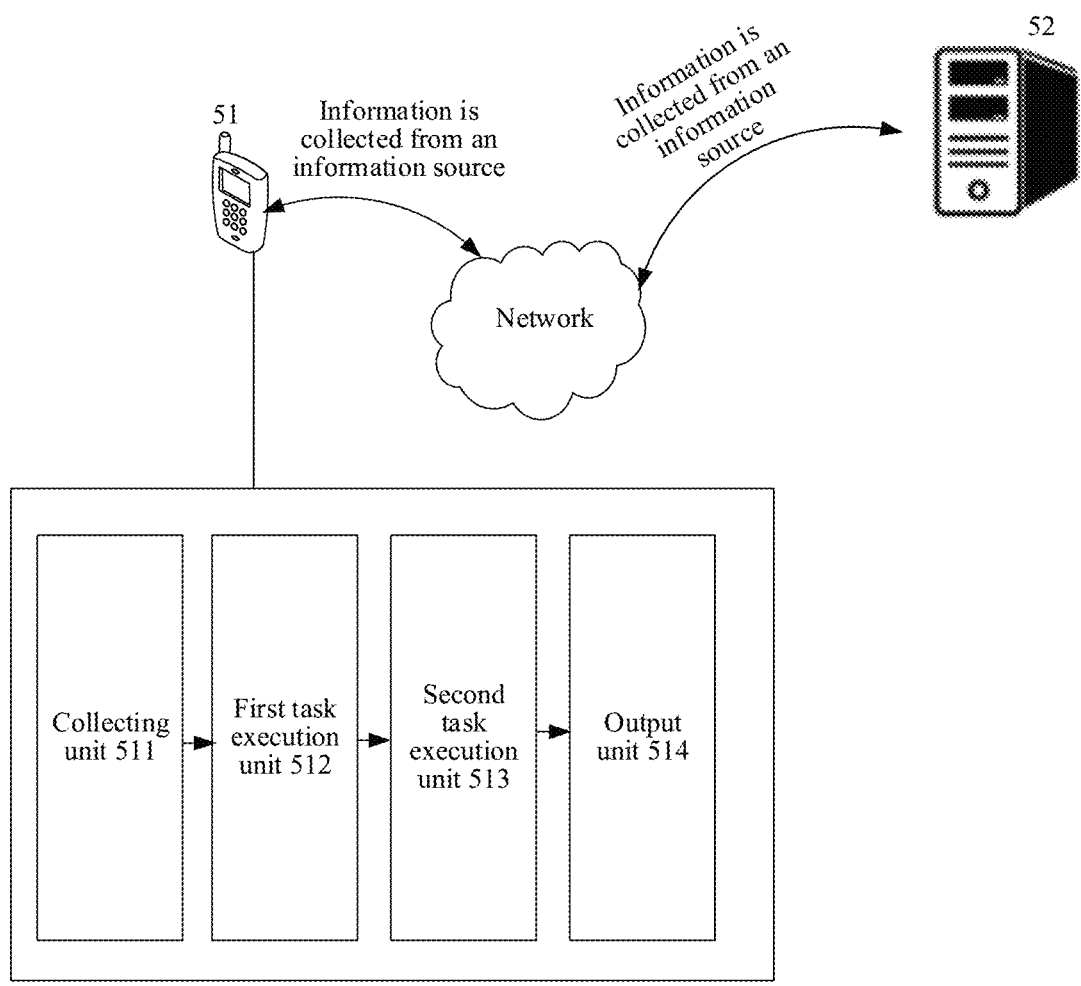
FIG. 8 is a schematic diagram of an information processing system to which an embodiment of the present application is applied.

As shown in FIG. 8, an embodiment of the present application provides an information processing system, including: a terminal 51 and a server 52, the server 52 serving as an information source for providing information to the terminal. Processing logic is performed on the terminal 51, the terminal including: a collecting unit 511 configured to collect first information; a first task execution unit 512 configured to execute an intent identification task on the first information to obtain an intent identification processing result; a second task execution unit 513 configured to execute a slot identification task according to the intent identification processing result, to obtain a slot identification processing result; and an output unit 514 configured to output a target result according to the slot identification processing result.

In an implementation, the terminal further includes: a first parsing unit, configured to parse out an intent identification parameter from the intent identification processing result; a second parsing unit, configured to parse out a slot identification parameter from the slot identification processing result to obtain; a first model constructing unit, configured to create, according to the intent identification parameter and the slot identification parameter, a first combined model representing feature association between intent identification and slot identification; a first extracting unit, configured to extract a first feature (for example, an auxiliary feature) from the first information; a second extracting unit, configured to extract a second feature (for example, an in-depth feature obtained using an RNN) from the first information; a third extracting unit, configured to: train the first combined model according to the first feature and the second feature, and stop training when the first combined model reaches a specified target, to obtain a first target parameter representing intent identification and a second target parameter representing slot identification, where in this case, the first target parameter corresponding to a first parameter and the second target parameter corresponding to a second parameter that are obtained through combined learning may be considered as a constant; and a second model constructing unit, configured to construct a second combined model according to the first target parameter and the second target parameter.

In an implementation, the terminal further includes: an obtaining unit, configured to obtain second information; a feedback unit, configured to provide a feedback response for the second information according to the second combined model to obtain feedback information. The second information is different from the foregoing first information, and the second information is a query put forward by a user in real time. The first information includes data of numerous queries, and is used for modeling.

In an implementation, the collecting unit is further configured to: collect the first information locally, the first information being from conversation content obtained from a real human-computer interaction environment; and/or collect the first information from a network side, and screen the first information to obtain target information, the target information being used to represent conversation content obtained from an almost real human-computer interaction environment.

In an implementation, the terminal further includes a creating unit, configured to: after the first information is collected, create a first information source composed of the first information and/or the target information.

In an implementation, the first task execution unit is further configured to: extract a to-be-processed object from the first information source; perform, on the to-be-processed object, first data labeling for intent identification; perform sampling detection on a result of the first data labeling, and determine that the first labeling result meets a target requirement when accuracy of a detection result is greater than a first threshold; and classify the to-be-processed object according to the first labeling result to obtain at least one classification result that represents different intent, and determine the at least one classification result as the intent identification processing result.

In an implementation, the second task execution unit is further configured to: perform, according to the at least one classification result, second data labeling for corresponding slot identification; perform sampling detection on a result of the second data labeling, and determine that the second labeling result meets a target requirement when accuracy of a detection result is greater than a second threshold; and determine the second labeling result as the slot identification processing result.

In an implementation, the first extracting unit is further configured to: extract a to-be-processed object from the first information source, and construct a slot feature word database for the to-be-processed object; and compare a specified object in the to-be-processed object to the slot feature word database in a lexicon matching manner, and search for all possible slot information included in the specified object, the slot information being used to represent the first feature.

In an implementation, the second extracting unit is further configured to: express the found slot information as a slot vector; and map the slot vector to an LSTM, and extract an in-depth feature of the to-be-processed object after fusion with the LSTM, to obtain the second feature.

An embodiment of the present application provides an information processing system, and a terminal in the system includes: a collecting unit, configured to collect first information; a first task execution unit, configured to execute an intent identification task on the first information to obtain an intent identification processing result; a second task execution unit, configured to execute a slot identification task according to the intent identification processing result, to obtain a slot identification processing result; a first parsing unit, configured to parse out an intent identification parameter from the intent identification processing result; a second parsing unit, configured to parse out a slot identification parameter from the slot identification processing result; a first model constructing unit, configured to create, according to the intent identification parameter and the slot identification parameter, a first combined model representing feature association between intent identification and slot identification; a first extracting unit, configured to extract a first feature from the first information; a second extracting unit, configured to extract a second feature from the first information; a third extracting unit, configured to: train the first combined model according to the first feature and the second feature, and stop training when the first combined model reaches a specified target, to obtain a first target parameter representing intent identification and a second target parameter representing slot identification; and a second model constructing unit, configured to construct a second combined model according to the first target parameter and the second target parameter.

An embodiment of the present application provides a terminal, the terminal including: a memory configured to store a computer program that can be run on a processor, and a processor configured to perform the following steps when the computer program is run: collecting first information;

executing an intent identification task on the first information to obtain an intent identification processing result;

executing a slot identification task on the first information according to the intent identification processing result, to obtain a slot identification processing result; and outputting a target result according to the slot identification processing result.

In an embodiment, the processor is further configured to perform the following steps when the computer program is run:

parsing out an intent identification parameter from the intent identification processing result;

parsing out a slot identification parameter from the slot identification processing result;

creating, according to the intent identification parameter and the slot identification parameter, a first combined model representing feature association between intent identification and slot identification;

extracting a first feature from the first information;

extracting a second feature from the first information;

training the first combined model according to the first feature and the second feature, and stopping training when the first combined model reaches a specified target, to obtain a first target parameter representing intent identification and a second target parameter representing slot identification; and constructing a second combined model according to the first target parameter and the second target parameter.

In an embodiment, the processor is further configured to perform the following steps when the computer program is run:

obtaining second information; and providing a feedback response for the second information according to the second combined model to obtain feedback information.

In an embodiment, the processor is further configured to perform the following steps when the computer program is run:

collecting the first information locally, the first information being from conversation content obtained from a real human-computer interaction environment; and/or collecting the first information from a network side, and screening the first information to obtain target information, the target information being used to represent conversation content obtained from an almost real human-computer interaction environment.

In an embodiment, the processor is further configured to perform the following steps when the computer program is run:

after the first information is collected, creating a first information source composed of the first information and/or the target information.

In an embodiment, the processor is further configured to perform the following steps when the computer program is run:

extracting a to-be-processed object from the first information source;

performing, on the to-be-processed object, first data labeling for intent identification;

performing sampling detection on a result of the first data labeling, and determining that the first labeling result meets a target requirement when accuracy of a detection result is greater than a first threshold; and classifying the to-be-processed object according to the first labeling result to obtain at least one classification result that represents different intent, and determining the at least one classification result as the intent identification processing result.

In an embodiment, the processor is further configured to perform the following steps when the computer program is run:

performing, according to the at least one classification result, second data labeling for corresponding slot identification;

performing sampling detection on a result of the second data labeling, and determining that the second labeling result meets a target requirement when accuracy of a detection result is greater than a second threshold; and determining the second labeling result as the slot identification processing result.

In an embodiment, the processor is further configured to perform the following steps when the computer program is run:

extracting a to-be-processed object from the first information source, and constructing a slot feature word database for the to-be-processed object; and comparing a specified object in the to-be-processed object to the slot feature word database in a lexicon matching manner, and searching for all possible slot information included in the specified object, the slot information being used to represent the first feature.

In an embodiment, the processor is further configured to perform the following steps when the computer program is run:

expressing the found slot information as a slot vector; and mapping the slot vector to an LSTM, and extracting an in-depth feature of the to-be-processed object after fusion with the LSTM, to obtain the second feature.

An embodiment of the present application provides a terminal, the terminal including: a memory configured to store a computer program that can be run on a processor, and a processor configured to perform the following steps when the computer program is run:

collecting first information;

executing an intent identification task on the first information to obtain an intent identification processing result;

executing an intent identification task on the first information to obtain a slot identification processing result;

parsing out an intent identification parameter from the intent identification processing result;

parsing out a slot identification parameter from the slot identification processing result;

creating, according to the intent identification parameter and the slot identification parameter, a first combined model representing feature association between intent identification and slot identification;

extracting a first feature from the first information;

extracting a second feature from the first information;

training the first combined model according to the first feature and the second feature, and stopping training when the first combined model reaches a specified target, to obtain a first target parameter representing intent identification and a second target parameter representing slot identification; and constructing a second combined model according to the first target parameter and the second target parameter.

Figure 9:
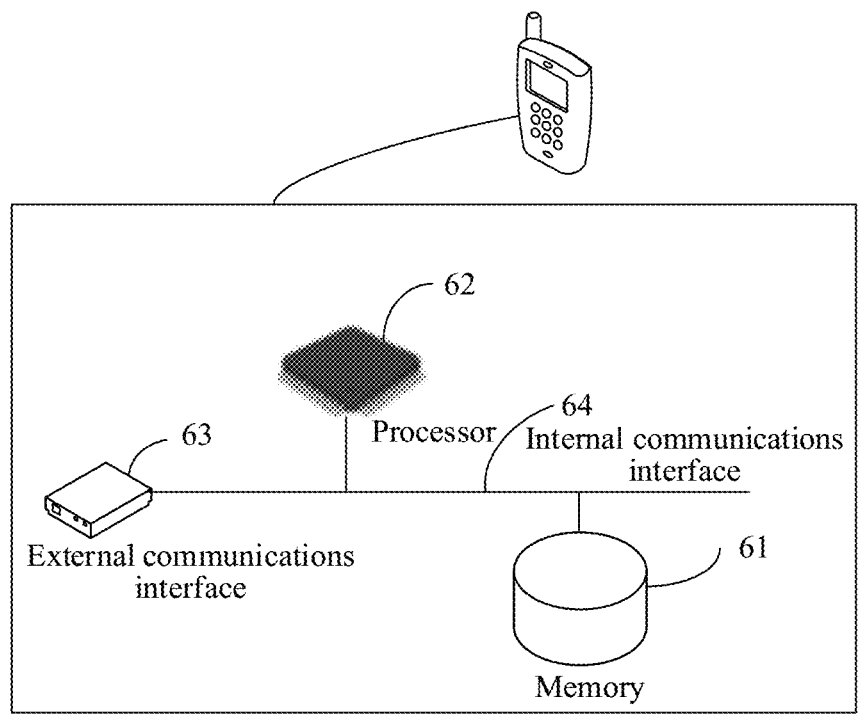
FIG. 9 is a schematic diagram of hardware components of a terminal according to an embodiment of the present application.

An embodiment of the present application provides a terminal. As shown in FIG. 9, the terminal includes: a memory 61 configured to store a computer program that can be run on a processor, and a processor 62 configured to perform the steps of the information processing method in the foregoing embodiments when the computer program is run. The terminal may further include: an external communications interface 63, the peripheral communications interface 63 being used for information exchange between a peripheral apparatus such as a terminal and a server. In particular, for example, the terminal executes a first task (such as an intent identification task) and a second task (such as a slot identification task) on the first information according to a task execution policy (serial processing or parallel processing), constructs a first combined model using a first parameter (such as an intent identification parameter) and a second parameter (such as a slot identification parameter), extracts, from the first information, a first feature (such as an auxiliary feature) for in-depth learning of the combined model, and extracts, from the first information, a second feature (such as an in-depth feature) for in-depth learning of the combined model, trains the first combined model according to the second feature and the first feature, stops training when the first combined model reaches a specified target, and extracts a new combined model composed of a first target parameter and a second target parameter, the new combined model being referred to as a second combined model, obtains second information, and provides a feedback response for the second information according to the first target parameter and the second target parameter, to obtain feedback information. The terminal may further include: an internal communications interface 64, and the internal communications interface 64 may specifically be a bus interface such as a PCI bus.

It should be noted herein that the foregoing descriptions of the terminal and server are similar to the foregoing descriptions of the method, and beneficial effects that are the same as those of the method are not described again. For technical details not disclosed in the terminal embodiments and the server embodiments of the present application, refer to descriptions in the embodiments described in the process of the method of the present application.

An embodiment of the present application provides a computer readable storage medium, the computer storage medium storing a computer program configured to perform the following steps when the computer program is executed by a processor:

collecting first information;

executing an intent identification task on the first information to obtain an intent identification processing result;

executing a slot identification task on the first information according to the intent identification processing result, to obtain a slot identification processing result; and outputting a target result according to the slot identification processing result.

In an embodiment, the computer program is configured to perform the following steps when executed by a processor:

parsing out an intent identification parameter from the intent identification processing result;

parsing out a slot identification parameter from the slot identification processing result;

creating, according to the intent identification parameter and the slot identification parameter, a first combined model representing feature association between intent identification and slot identification;

extracting a first feature from the first information;

extracting a second feature from the first information;

training the first combined model according to the first feature and the second feature, and stopping training when the first combined model reaches a specified target, to obtain a first target parameter representing intent identification and a second target parameter representing slot identification; and constructing a second combined model according to the first target parameter and the second target parameter.

In an embodiment, the computer program is configured to perform the following steps when executed by a processor:

obtaining second information; and providing a feedback response for the second information according to the second combined model to obtain feedback information.

In an embodiment, the computer program is configured to perform the following steps when executed by a processor:

collecting the first information locally, the first information being from conversation content obtained from a real human-computer interaction environment; and/or collecting the first information from a network side, and screening the first information to obtain target information, the target information being used to represent conversation content obtained from an almost real human-computer interaction environment.

In an embodiment, the computer program is configured to perform the following steps when executed by a processor:

after the first information is collected, creating a first information source composed of the first information and/or the target information.

In an embodiment, the computer program is configured to perform the following steps when executed by a processor:

extracting a to-be-processed object from the first information source;

performing, on the to-be-processed object, first data labeling for intent identification;

performing sampling detection on a result of the first data labeling, and determining that the first labeling result meets a target requirement when accuracy of a detection result is greater than a first threshold; and classifying the to-be-processed object according to the first labeling result to obtain at least one classification result that represents different intent, and determining the at least one classification result as the intent identification processing result.

In an embodiment, the computer program is configured to perform the following steps when executed by a processor:

performing, according to the at least one classification result, second data labeling for corresponding slot identification;

performing sampling detection on a result of the second data labeling, and determining that the second labeling result meets a target requirement when accuracy of a detection result is greater than a second threshold; and determining the second labeling result as the slot identification processing result.

In an embodiment, the computer program is configured to perform the following steps when executed by a processor:

extracting a to-be-processed object from the first information source, and constructing a slot feature word database for the to-be-processed object; and comparing a specified object in the to-be-processed object to the slot feature word database in a lexicon matching manner, and searching for all possible slot information included in the specified object, the slot information being used to represent the first feature.

In an embodiment, the computer program is configured to perform the following steps when executed by a processor:

expressing the found slot information as a slot vector; and mapping the slot vector to an LSTM, and extracting an in-depth feature of the to-be-processed object after fusion with the LSTM, to obtain the second feature.

An embodiment of the present application provides a computer readable storage medium, the computer storage medium storing a computer program configured to perform the following steps when the computer program is executed by a processor:

collecting first information;

executing an intent identification task on the first information to obtain an intent identification processing result;

executing an intent identification task on the first information to obtain a slot identification processing result;

parsing out an intent identification parameter from the intent identification processing result;

parsing out a slot identification parameter from the slot identification processing result;

creating, according to the intent identification parameter and the slot identification parameter, a first combined model representing feature association between intent identification and slot identification;

extracting a first feature from the first information;

extracting a second feature from the first information;

training the first combined model according to the first feature and the second feature, and stopping training when the first combined model reaches a specified target, to obtain a first target parameter representing intent identification and a second target parameter representing slot identification; and constructing a second combined model according to the first target parameter and the second target parameter.

In the several embodiments provided in this application, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separate parts may or may not be physically separate, and parts displayed as units may or may not be physical units, may be located in one location, or may be distributed on multiple network units. Some or all of the units may be selected according to actual needs to achieve the objectives of the solutions of the embodiments.

In addition, the functional units in the embodiments of the present application may all be integrated into one processing unit, or each of the units may exist separately, or two or more units are integrated into one unit, and the integrated unit may be implemented in a form of hardware, or may be implemented in a form of hardware in addition to a software functional unit.

A person of ordinary skill in the art may understand that, all or a part of the steps of the foregoing method embodiments may be implemented by a program instructing relevant hardware. The foregoing programs may be stored in a computer readable storage medium. When the program runs, the foregoing steps of the method embodiments are performed. The foregoing storage medium includes various mediums capable of storing program codes, such as a ROM, a RAM, a magnetic disk, or an optical disk.

Alternatively, when the integrated module in the present application is implemented in the form of a software function module and sold or used as an independent product, the integrated module may be stored in a computer readable storage medium. Based on such an understanding, the technical solutions of the embodiments of the present application essentially, or the part contributing to the related technology may be implemented in a form of a software product. The computer software product is stored in a storage medium and includes several instructions for instructing a computer device (which may be a personal computer, a server, a network device, or the like) to perform all or some of the methods described in the embodiments of the present application. The foregoing storage medium includes: any medium that can store program code, such as a portable storage device, a ROM, a RAM, a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

INDUSTRIAL APPLICABILITY

According to the embodiments of the present application, the first information is collected, and the intent identification task is executed on the first information to obtain the intent identification processing result, and then the slot identification task is executed according to the intent identification processing result to obtain the slot identification processing result. In this serial processing mechanism, association between feature attributes of the two processing results of the intent identification task and the slot identification task can be utilized to output the target result according to the slot identification processing result. Since the serial processing mechanism can achieve an association effect, a search range can be narrowed, and an excessive waste of time is avoided. For a user, processing is transparent, and the user can get a desired answer quickly only after inputting a query. In addition, the answer has high accuracy, and is feedback information that meets a user requirement most and that is most likely, so that an overall effect of human-computer interaction is improved.

What is claimed is:

1. An information processing method performed by a computing device having one or more processors, memory, and one or more computer programs stored in the memory to be executed by the one or more processors, the method comprising:

collecting first information and mapping each word in the first information to a word vector;

executing an intent identification task on the first information to obtain an intent identification processing result;

executing a slot identification task on the first information according to the intent identification processing result, to obtain a slot identification processing result;

extracting a first auxiliary feature and a second in-depth feature from the first information, wherein the second in-depth feature is extracted from one or more sentences in the first information using a bidirectional varietal recurrent neural network;

training the first combined model according to the first auxiliary feature and the second in-depth feature until the first combined model reaches a specified target such that a target function is maximized, to obtain a first target parameter representing intent identification and a second target parameter representing slot identification; and outputting a target result according to the slot identification processing result and the first target parameter.

2. The method according to claim 1, further comprising:
parsing out an intent identification parameter from the intent identification processing result;
parsing out a slot identification parameter from the slot identification processing result;
creating, according to the intent identification parameter and the slot identification parameter, a first combined model representing feature association between intent identification and slot identification;
constructing a second combined model according to the first target parameter and the second target parameter.

3. The method according to claim 2, further comprising:
obtaining second information; and
providing a feedback response for the second information according to the second combined model to obtain feedback information.

4. The method according to claim 2, wherein the collecting first information comprises:
collecting the first information locally, the first information being from conversation content obtained from a real human-computer interaction environment; and/or
collecting the first information from a network side, and screening the first information to obtain target information, the target information being used to represent conversation content obtained from an almost real human-computer interaction environment.

5. The method according to claim 4, further comprising:
after the first information is collected, creating a first information source composed of the first information and/or the target information.

6. The method according to claim 5, wherein the executing an intent identification task on the first information to obtain an intent identification processing result comprises:
extracting a to-be-processed object from the first information source;
performing, on the to-be-processed object, first data labeling for intent identification;
performing sampling detection on a result of the first data labeling, and determining that the first labeling result meets a target requirement when accuracy of a detection result is greater than a first threshold; and
classifying the to-be-processed object according to the first labeling result to obtain at least one classification result that represents different intent, and determining the at least one classification result as the intent identification processing result.

7. The method according to claim 6, wherein the executing a slot identification task on the first information according to the intent identification processing result, to obtain a slot identification processing result comprises:
performing, according to the at least one classification result, second data labeling for corresponding slot identification;
performing sampling detection on a result of the second data labeling, and determining that the second labeling result meets a target requirement when accuracy of a detection result is greater than a second threshold; and determining the second labeling result as the slot identification processing result.

8. The method according to claim 5, wherein the extracting a first auxiliary feature from the first information comprises:
   extracting a to-be-processed object from the first information source, and constructing a slot feature word database for the to-be-processed object;
   comparing a specified object in the to-be-processed object to the slot feature word database in a lexicon matching manner; and
   searching for all possible slot information comprised in the specified object, the slot information being used to represent the first auxiliary feature.

9. The method according to claim 8, wherein the extracting a second in-depth feature from the first information comprises:
   expressing the found slot information as a slot vector; and
   mapping the slot vector to a varietal recurrent neural network (RNN), and extracting an in-depth feature of the to-be-processed object after fusion with the varietal RNN, to obtain the second in-depth feature.

10. A computing device comprising one or more processors, memory coupled to the one or more processors and a plurality of programs stored in the memory that, when executed by the one or more processors, cause the computing device to perform a plurality of operations comprising:
   collecting first information and mapping each word in the first information to a word vector;
   executing an intent identification task on the first information to obtain an intent identification processing result;
   executing a slot identification task on the first information according to the intent identification processing result, to obtain a slot identification processing result;
   extracting a first auxiliary feature and a second in-depth feature from the first information, wherein the second in-depth feature is extracted from one or more sentences in the first information using a bidirectional varietal recurrent neural network;
   training the first combined model according to the first auxiliary feature and the second in-depth feature until the first combined model reaches a specified target such that a target function is maximized, to obtain a first target parameter representing intent identification and a second target parameter representing slot identification; and
   outputting a target result according to the slot identification processing result and the first target parameter.

11. The computing device according to claim 10, wherein the plurality of operations further comprise:
   parsing out an intent identification parameter from the intent identification processing result;
   parsing out a slot identification parameter from the slot identification processing result;
   creating, according to the intent identification parameter and the slot identification parameter, a first combined model representing feature association between intent identification and slot identification;
   constructing a second combined model according to the first target parameter and the second target parameter.

12. The computing device according to claim 11, wherein the plurality of operations further comprise:
   obtaining second information; and
   providing a feedback response for the second information according to the second combined model to obtain feedback information.

13. The computing device according to claim 11, wherein the collecting first information comprises:
   collecting the first information locally, the first information being from conversation content obtained from a real human-computer interaction environment; and/or
   collecting the first information from a network side, and screening the first information to obtain target information, the target information being used to represent conversation content obtained from an almost real human-computer interaction environment.

14. The computing device according to claim 13, wherein the plurality of operations further comprise:
   after the first information is collected, creating a first information source composed of the first information and/or the target information.

15. The computing device according to claim 14, wherein the executing an intent identification task on the first information to obtain an intent identification processing result comprises:
   extracting a to-be-processed object from the first information source;
   performing, on the to-be-processed object, first data labeling for intent identification;
   performing sampling detection on a result of the first data labeling, and determining that the first labeling result meets a target requirement when accuracy of a detection result is greater than a first threshold; and
   classifying the to-be-processed object according to the first labeling result to obtain at least one classification result that represents different intent, and determining the at least one classification result as the intent identification processing result.

16. The computing device according to claim 15, wherein the executing a slot identification task on the first information according to the intent identification processing result, to obtain a slot identification processing result comprises:
   performing, according to the at least one classification result, second data labeling for corresponding slot identification;
   performing sampling detection on a result of the second data labeling, and determining that the second labeling result meets a target requirement when accuracy of a detection result is greater than a second threshold; and
   determining the second labeling result as the slot identification processing result.

17. A non-transitory computer readable storage medium storing a plurality of machine readable instructions in connection with a computing device having one or more processors, wherein the plurality of machine readable instructions, when executed by the one or more processors, cause the computing device to perform a plurality of operations including:
   collecting first information and mapping each word in the first information to a word vector;
   executing an intent identification task on the first information to obtain an intent identification processing result;
   executing a slot identification task on the first information according to the intent identification processing result, to obtain a slot identification processing result; and
   extracting a first auxiliary feature and a second in-depth feature from the first information, wherein the second in-depth feature is extracted from one or more sentences in the first information using a bidirectional varietal recurrent neural network;
   training the first combined model according to the first auxiliary feature and the second in-depth feature until the first combined model reaches a specified target such that a target function is maximized, to obtain a first target parameter representing intent identification and a second target parameter representing slot identification;

outputting a target result according to the slot identification processing result and the first target parameter.

18. The non-transitory computer readable storage medium according to claim 17, wherein the plurality of operations further comprise:

parsing out an intent identification parameter from the intent identification processing result;

parsing out a slot identification parameter from the slot identification processing result;

creating, according to the intent identification parameter and the slot identification parameter, a first combined model representing feature association between intent identification and slot identification;

constructing a second combined model according to the first target parameter and the second target parameter.

19. The non-transitory computer readable storage medium according to claim 18, wherein the plurality of operations further comprise:

obtaining second information; and providing a feedback response for the second information according to the second combined model to obtain feedback information.

20. The non-transitory computer readable storage medium according to claim 18, wherein the collecting first information comprises:

collecting the first information locally, the first information being from conversation content obtained from a real human-computer interaction environment; and/or collecting the first information from a network side, and screening the first information to obtain target information, the target information being used to represent conversation content obtained from an almost real human-computer interaction environment.

* * * * *